Patented May 22, 1934

1,959,455

UNITED STATES PATENT OFFICE 1,959,455

DIAMINOTRIARYLMETHANE DYES

Otto Böger, Dessau in Anhalt, and Oswald Meissner, Uerdingen-on-the-Rhine, Germany, assignors to General Aniline Works, Inc., New York, N. Y., a corporation of Delaware No Drawing. Application September 28, 1931, Serial No. 565,694. In Germany April 23, 1927

5 Claims. (Cl. 260—68)

Our present invention relates to new dyes of the diaminotriarylmethane series and more particularly to dyes corresponding to the general formula

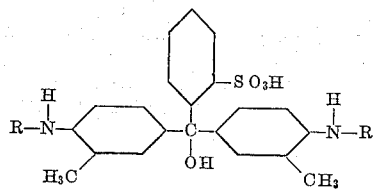

wherein R means the radicle of an unbranched aliphatic hydrocarbon with more than two carbon atoms up to seven carbon atoms, such as n-propyl, n-butyl or n-heptyl, wherein the benzene nuclei may contain further substituents such as halogen, alkyl or hydroxy and wherein the benzene nucleus bearing a sulfonic acid radicle, may contain more than one sulfonic acid group.

Our new products are obtainable by condensing in the known manner one molecular proportion of a benzaldehyde-ortho-sulfonic acid with two molecular proportions of a phenylamine substituted in the amino group by an alkyl radicle of the group mentioned above. Such alkylphenylamines are made, for instance, by interaction of a phenylamine with 1-chloropropane, 1-chlorobutane, 1-chloropentane or 1-chloroheptane. The leuco compounds thus obtainable may be oxidized in the known manner in order to produce the dyes.

The dyes thus obtainable dye wool blue tints and have an outstanding good equalizing property. These tints are fast to alkali and have a considerably greater coloring power than the corresponding dyes substituted in the amino group by methyl or ethyl. In the dry shape of their sodium salts they are dark powders soluble in water with a blue color, their dyeings on wool are distinguished by uniformity and by remarkable clearness and beauty, even in artificial light.

The following examples serve to illustrate our invention, the parts being by weight:—

Example 1.—26.6 parts of benzaldehyde-2.5-disulfonic acid are condensed in the presence of dilute sulfuric acid of about 10% strength with 32 parts of 2-mono-n-propylamino-1-methylbenzene. To the suspension of the leuco compound formed a caustic alkali is added. The 2-mono-n-propylamino-1-methylbenzene in excess is removed by distillation with steam, the remaining solution is filtered and oxidized in the usual manner with potassium bichromate in the presence of oxalic acid and sulfuric acid. Common salt is added and 54.6 parts of the dye free of salt are thus obtained. This dye dyes wool and silk clear blue tints. It shows an excellent levelling power and has a coloring power which is about 70% better than that of the corresponding dye made from benzaldehyde-2.5-disulfonic acid and 2-mono-ethylamino-1-methylbenzene.

In the foregoing example the benzaldehyde-2.5-disulfonic acid may be substituted by benzaldehyde-2.4-disulfonic acid or by a corresponding quantity of, for instance, xylylaldehyde-ortho-sulfonic acid. The 2-mono-n-propylamino-1-methylbenzene may be replaced by a corresponding amine being substituted by alkyl or halogen in the benzene nucleus.

Example 2.—26.6 parts of benzaldehyde-2.4-disulfonic acid are condensed in the presence of dilute sulfuric acid of about 10% strength with 37 parts of 2-mono-n-butylamino-1-methylbenzene. The leuco compound formed is separated by filtration and dissolved in the calculated quantity of caustic soda and water and is oxidized with potassium bichromate and hydrochloric acid. After addition of common salt, 57.4 parts of the dye free of salt are obtained, which shows besides an excellent levelling power about the double power of coloring when compared with the dye made from benzaldehyde-2.4-disulfonic acid and 2-mono-ethylamino-1-methylbenzene.

In this case, the benzaldehyde-2.4-disulfonic acid may be replaced by benzaldehyde-2.5-disulfonic acid, the 2-mono-n-butylamino-1-methylbenzene may bear halogen or alkyl radicles as substituents in the benzene nucleus.

Example 3.—12.2 parts of meta-hydroxybenzaldehyde are condensed with 41 parts of 2-mono-n-heptylamino-1-methylbenzene in the presence of strong sulfuric acid of about 60° Bé. The melt obtained is treated in the usual manner with fuming sulfuric acid until a test is clearly soluble in ammonia. The product of sulfonation is poured into water, whereat the leuco sulfonic acid separates; it is filtered off and dissolved in dilute caustic soda. This solution is oxidized with pyrolusite in the presence of formic acid. After addition of common salt 67.4 parts of a salt-free dye are obtained from the filtered solution. This dye, likewise, shows besides an excellent levelling power about the double power of coloring when compared with the known dye made from 2-monoethylamino-1-methylbenzene and meta-hydroxybenzaldehyde (cf. Schultz, Julius, Farbstofftabellen, 1923, Vol. 1, No. 546).

Our invention is not limited to the foregoing examples or to the specific details given therein. Thus, for instance, we may start from benzaldehyde-2-sulfonic acid or its derivatives, or from the derivatives of a benzaldehyde disulfonic acid with a sulfonic acid group in ortho-position bearing halogen or alkyl as a substituent. The n-alkylphenylamines of the group in question may be substituted in a similar manner and, likewise, may contain a sulfonic acid group. All these variations are considered to be in the scope of the present invention and of the claims following hereafter.

The present specification is a continuation in part of our copending application Serial No. 267,130, filed April 3, 1928.

What we claim is:—

1. The dyes of the diaminotriphenylmethane series being salts of an acid represented by the general formula

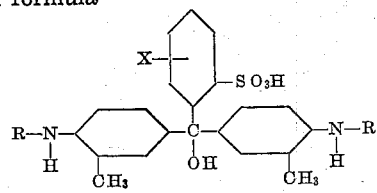

wherein X may be a sulfonic acid group and R is a radicle of an unbranched aliphatic hydrocarbon with more than two and at most seven carbon atoms, and wherein the benzene nuclei may be substituted by halogen, alkyl, hydroxy or a sulfonic acid radicle, these dyes being in the shape of their dry sodium salts dark powders, being soluble in water with blue color and dyeing wool blue tints distinguished by evenness and clearness even in artificial light and having an essentially higher power of coloring than the correspondent ethyl compounds.

2. The dyes of the diaminotriphenylmethane series being salts of an acid represented by the general formula

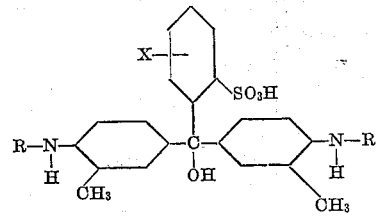

wherein X may be a sulfonic acid group and R is a radicle of an unbranched aliphatic hydrocarbon with more than two and at most seven carbon atoms, these dyes being in the shape of their dry sodium salts dark powders, being soluble in water with blue color and dyeing wool blue tints distinguished by evenness and clearness even in artificial light and having an essentially higher power of coloring than the correspondent ethyl compounds.

3. The dyes of the diaminotriphenylmethane series being salts of an acid represented by the general formula

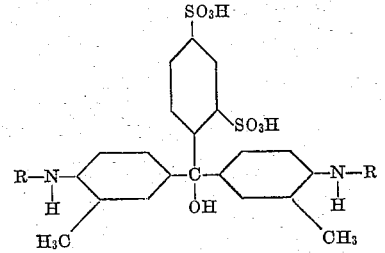

wherein R is a radicle of an unbranched aliphatic hydrocarbon with more than two and at most seven carbon atoms, these dyes being in the shape of their dry sodium salts dark powders, being soluble in water with blue color and dyeing wool blue tints distinguished by evenness and clearness even in artificial light and having an essentially higher power of coloring than the correspondent ethyl compounds.

4. The dye of the diaminotriphenylmethane series being a salt of an acid represented by the formula

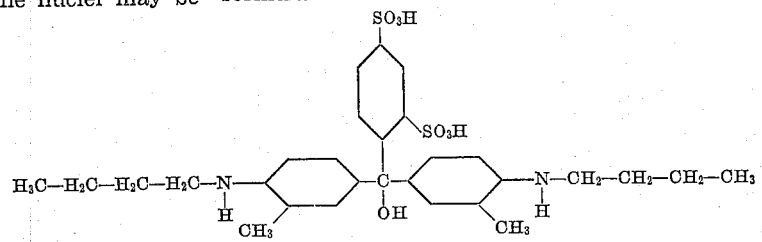

this dye being in the shape of its dry sodium salt a dark powder, soluble in water with blue color and dyeing wool blue tints distinguished by evenness and clearness even in artificial light, and having an essentially higher power of coloring than the correspondent ethyl compounds.

5. The dye of the diaminotriphenylmethane series being a salt of an acid represented by the formula

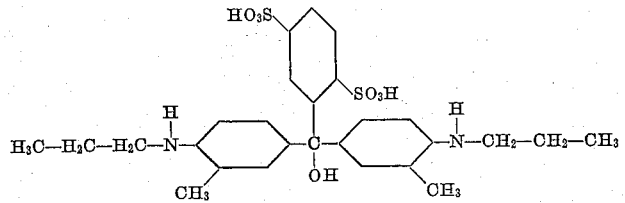

this dye being in the shape of its dry sodium salt a dark powder, soluble in water with blue color and dyeing wool blue tints distinguished by evenness and clearness even in artificial light, and having an essentially higher power of coloring than the correspondent ethyl compounds.

OTTO BÖGER.
OSWALD MEISSNER.